United States Patent [19]

Morgan et al.

[11] Patent Number: 4,741,217

[45] Date of Patent: May 3, 1988

[54] MAGNETIC FIELD COUPLING CIRCUIT AND ROTARY TRANSDUCER USING SAME

[75] Inventors: Paul W. Morgan, Pontiac; Richard C. Phillips, Birmingham, both of Mich.

[73] Assignee: Eaton Corporation, Cleveland, Ohio

[21] Appl. No.: 34,238

[22] Filed: Apr. 6, 1987

[51] Int. Cl.⁴ .......................... G01L 3/10; H01F 23/00
[52] U.S. Cl. ................................. 73/862.35; 73/773; 336/120
[58] Field of Search .............. 73/862.35, 862.33, 773; 336/83, 120, 123

[56] References Cited

U.S. PATENT DOCUMENTS

| | | | |
|---|---|---|---|
| 3,441,886 | 4/1969 | Tveter | 336/123 X |
| 3,717,029 | 2/1973 | Tveter | 73/862.35 X |
| 3,790,811 | 2/1974 | Cooper et al. | 336/120 X |
| 3,983,434 | 9/1976 | Sims | 310/254 |
| 4,307,310 | 12/1981 | Wedman et al. | 310/177 |
| 4,578,606 | 3/1986 | Welterlin | 310/68 R |
| 4,610,168 | 9/1986 | Morgan | 73/862.33 |

Primary Examiner—Charles A. Ruehl
Attorney, Agent, or Firm—D. A. Rowe; A. E. Chrow

[57] ABSTRACT

An improved electromagnetic coupling circuit (16) is provided that features a rotor (18) carrying rotary windings (39) rotated by a rotary member (2) within an annular air gap (41) between two magnetic stator sections (34, 34') in which are disposed stator windings (40) and of which at least one of stator sections (34, 34') comprises a plurality of circumferentially-spaced wedge shaped segments (50) mounted upon a support member (27, 27') and having at least a portion of their respective facing edges in electrical contact with each other enabling low cost manufacture of large diameter stator sections.

8 Claims, 2 Drawing Sheets

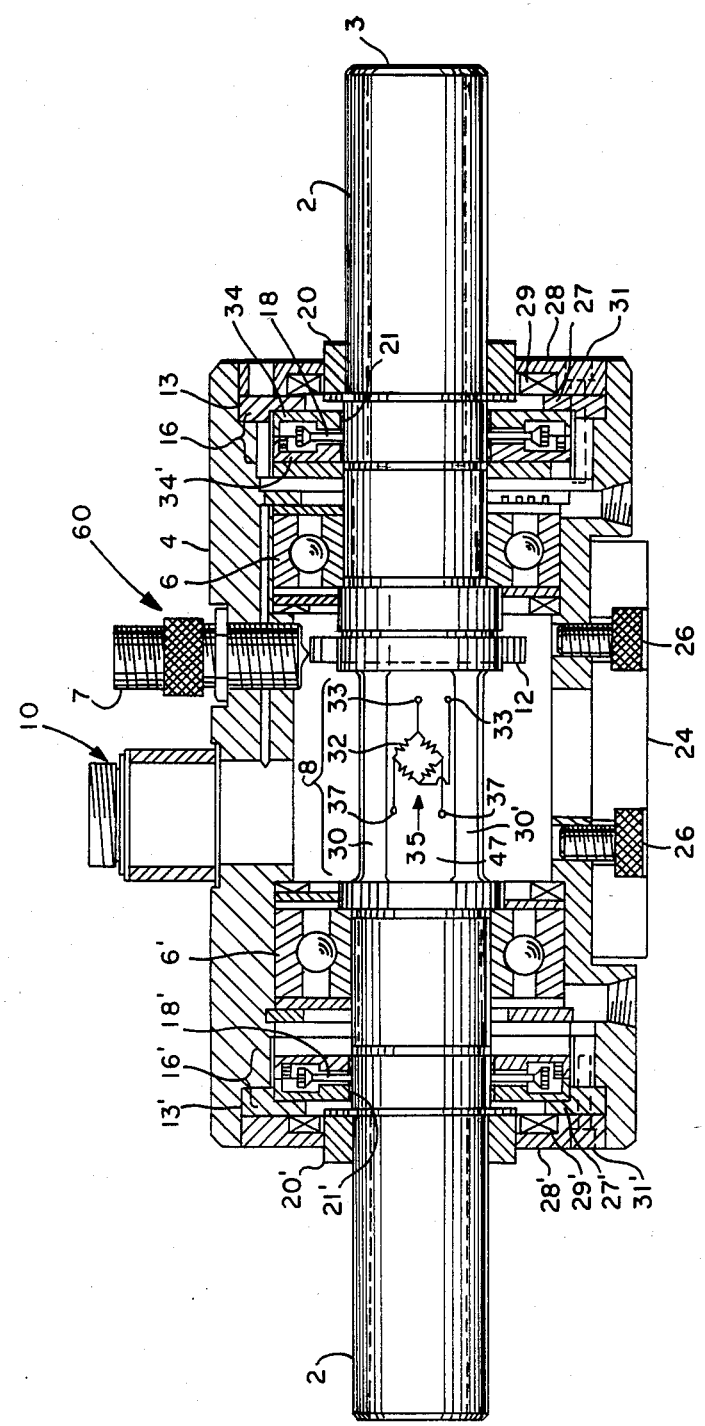

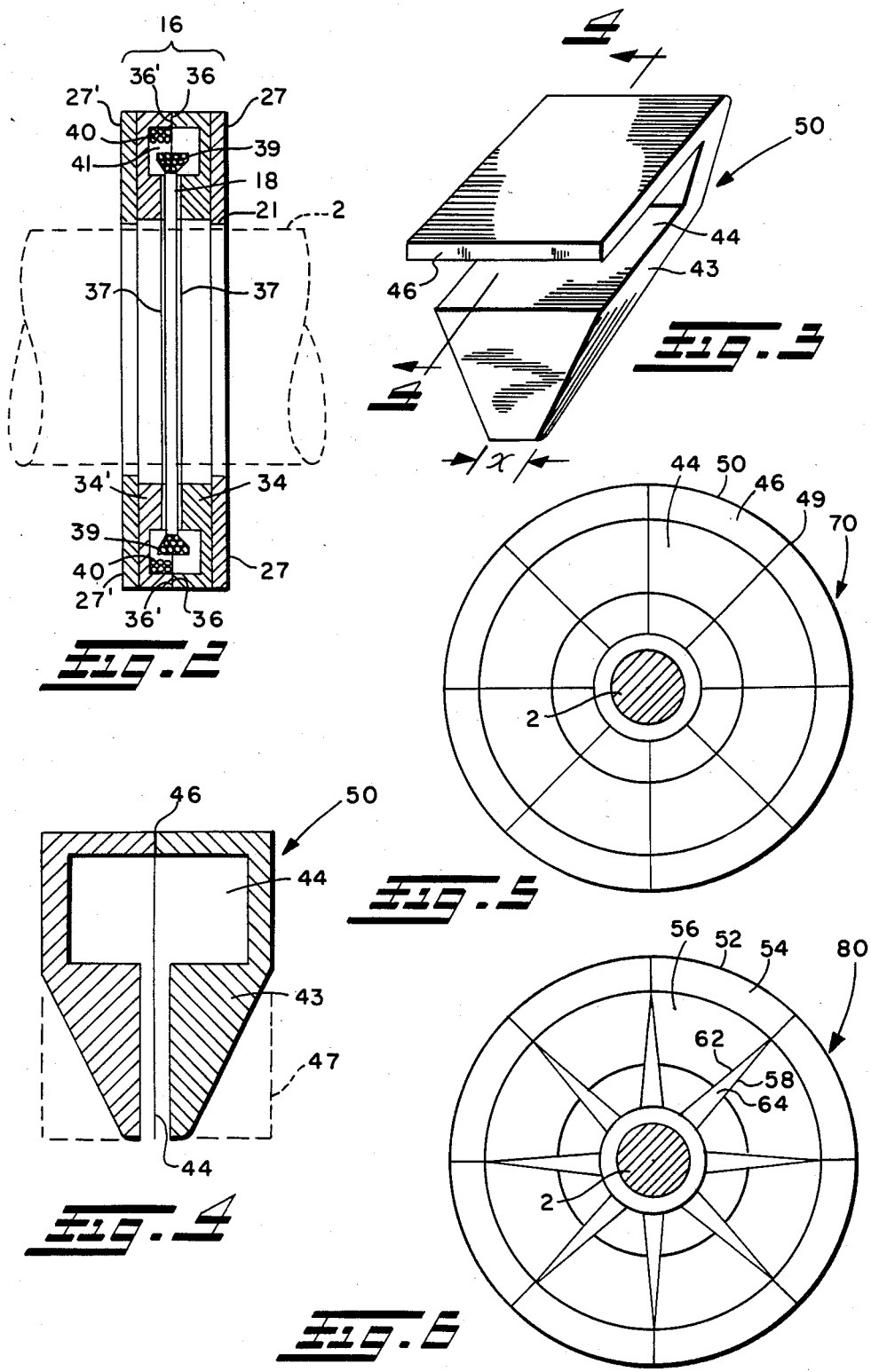

4,741,217

MAGNETIC FIELD COUPLING CIRCUIT AND ROTARY TRANSDUCER USING SAME

INTRODUCTION

This invention relates generally to a magnetic field coupling circuit between relatively fixed and rotary members and more particularly to a magnetic field coupling circuit that comprises a rotor member that rotates in unison with the rotary member within an annular air gap about the rotary member defined between a pair of fixed axially-spaced magnetic stator sections that are in electrical contact relationship with each other and which upon electrification provide an electromagnetic field that in conjunction with the rotor member provides the magnetic field coupling circuit between the rotary and fixed members and of which at least one of the stator sections comprises a plurality of wedge shaped segments spaced circumferentially about the rotary member having at least a portion of their respective facing edges providing electrical contact therebetween.

BACKGROUND OF THE INVENTION

Electromagnetic coupling circuits have been used for many years for transferring torque between two rotatable members and for providing a medium for transferring an electrical signal between a rotary member and a fixed member.

Generally, such coupling circuits comprise a magnetic stator member that includes electrical windings that upon electrification create an electromagnetic field whose force is operative to either attract or repel a rotor member according to the direction of current flow through the windings. Such is commonly employed in magnetic clutches and the like where one part of a frictional clutch member is either biased into or away from engagement with a second part of the clutch member and electrification of a magnetic portion of one of the parts is operative to overcome the bias and either engage or disengage the parts.

More particularly, electromagnetic coupling circuits are advantageous for transferring an electrical signal from a stationary member to a rotary member or vice versa. In such cases, the rotor carries electrical windings into which is induced an electrical current as the rotor windings enclose lines of magnetic flux created by the electromagnetic field created by the stator windings so that by means of such electromagnetic coupling circuits an electrical signal such as voltage can be transferred from the fixed to the rotary member or vice versa.

Such electromagnetic coupling circuits are particularly advantageous for rotary transducers operative to monitor stress imposed upon a rotating shaft such as disclosed in U.S. Pat. No. 4,610,168, owned by the assignee of the present and the disclosure of which is incorporated herein by reference. Such transducers commonly employ two electromagnetic stator-rotor assemblies at opposite ends of a section of a rotating shaft that has been altered in some manner such as by having a reduced diameter or having flats dressed onto its outer surface to provide an enhanced stress monitoring section.

A sensor such as a RTD or piezo-electric, or piezo resistive or acoustic emission transducer, or resistance or capacitive strain gage is secured to the enhanced section as part of the sensing circuit to which an excitation voltage or signal is delivered by means of one of the coupling circuits and whose output signal corresponding to stress is transferred from the rotary to the fixed member for processing by mean of the other coupling circuit.

Wheatstone bridges are commonly employed in such circuits and may be located either on the rotary or the fixed member such as, for example, where both a resistance strain gage and its associated wheatstone bridge are both secured to the enhanced stress monitoring section of the rotary member.

Up until the time of the present invention, a problem has existed in providing electromagnetic coupling circuits for large diameter rotary shafts. Such shafts necessarily require correspondly large diameter rotors which require large diameter magnetic stators for providing effective electromagnetic coupling.

Such large magnetic stators may be six or more inches in diameter and are extremely difficult and costly to make in one piece. They are commonly made by molding or machining ferromagnetic material such as an iron-based composition which is then secured to a support member which is secured to and electrically insulated from the fixed member.

The present invention overcomes the difficulties and expense associated with large diameter magnetic stators heretofor used by breaking completely away from past practice and providing an electromagnetic coupling circuit operative over a broad range of rotor and stator diameters by providing a magnetic stator of the type hereinbefore described that comprises a plurality of wedge shaped sections spaced circumferentially about the rotary member that are substantially less difficult and costly to make than the one-piece magnetic stators hereinbefore employed.

SUMMARY OF THE INVENTION

Accordingly, it is an object of this invention to provide an improved electromagnetic coupling circuit.

It is another object of this invention to provide an improved electromagnetic coupling circuit operative over a broad range of rotary member diameters that utilize magnetic stators that are less difficult and less costly to manufacture than those utilized in the past.

It is still another object of this invention to provide an improved rotary transducer employing an electromagnetic coupling circuit that utilizes magnetic stator members operative over a broad range of rotary member diameters that are less difficult and less costly to manufacture than those utilized in the past.

BRIEF DESCRIPTION OF THE DRAWINGS

FIG. 1 is a central cross-sectional view through a rotary transducer 60 utilizing the improved magnetic field coupling circuit of the invention.

FIG. 2 is an expanded central cross-sectional view of one of the magnetic coupling circuits of transducer of FIG. 1;

FIG. 3 is a perspective view of one of the segments utilized in at least one of the magnetic stator members of transducer 60 of FIG. 1;

FIG. 4 is a cross-sectional view along line 4—4 of FIG. 3 of two opposed magnetic stator members of which one is shown in the perspective view of FIG. 3;

FIG. 5 is a front axial view of an embodiment of a magnetic stator employing a plurality of wedge shaped segments spaced circumferentially about a rotary member having the entire length of their respective adjacent facing edges in electrical contact with each other; and FIG. 6 is a front axial view of an embodiment of a magnetic stator employing a plurality of wedge shaped segments spaced circumferentially about a rotary member having only a portion of their respective adjacent facing edges in electrical contact with each other.

DESCRIPTION OF SOME PREFERRED EMBODIMENTS

In FIG. 1, rotary transducer 60 is operative to monitor stress imposed upon rotary member 2 such as a solid or tubular shaft or rod. Rotary member 2 may for example be rotatably driven by a motor at end 3 and have its opposite end connected to a tool such as a drill and transducer 60 is being used to monitor torque imposed upon rotary member 2 by the workpiece being drilled.

Rotary transducer 60 has a fixed housing 4 through which rotary member 2 is journaled for rotation by spaced-apart bearings 6 and 6'. Housing 4 may, of course, be any fixed housing adapted to rotatably support member 2 in conjunction with the magnetic coupling circuit hereinafter described. Rotary member 2 is provided with a stress enhanced sensing section between bearings 6 and 6' referenced by numeral 8. Section 8 is of smaller diameter than the diameter of rotary member 2 exposed outside of housing 4 and is provided with four diametrically opposed flats 47 (only one referenced) in its outer surface separated by curved edges of which two are shown in FIG. 1 by numerals 30 and 30'.

A sensor member in the form of resistance strain gage 32 is secured to flat 47 as part of a wheatstone bridge generally referenced by numeral 35. Strain gage 32 is oriented at about 45° to the rotational axis of rotary member 2 enabling it it monitor torque imposed upon rotary member 2 as is well known to those skilled in the art.

As previously described rotary transducer 60 may employ one or more sensors and/or related electrical circuitry such as a wheatstone bridge requiring an electrical excitation signal and/or providing a electrical output signal therefrom.

Housing 4 is preferably provided with a removable cover plate 24 secured to housing 4 by suitable fasteners such as threaded fasteners referenced by numerals 26 for providing access to section 8. Transducer 60 may include a sensor for sensing rotational speed of member 2 such as a Hall effect type sensor which senses proximity of spaced protuberances 12 extending radially outwardly from member 2.

For the stress sensor circuitry shown in FIG. 1, an excitation voltage must be delivered from housing 4 to leads 33 on rotary member 2 and the output signal provided by leads 37 of bridge 35 must be delivered from rotary member 2 to housing 4.

The means by which the signal is provided by one or more strain gages or the excitation voltage or signal is delivered to the wheatstone bridge secured to rotary member 2 and the output voltage or signal is delivered therefrom is provided by a magnetic field coupling circuit controlled in a manner hereinafter described.

Housing 4 is provided with electrically conductive annular stator members 16 and 16' at opposite ends thereof. The opposite ends of housing 4 are bored to respectively receive stator members 16 and 16'. Stator members 16 and 16' are commonly electrically conductive to housing 4 and are provided with central openings therethrough having a diameter greater than the diameter of member 2 at the location at which stator members 16 and 16' are positioned with respect to member 2 within housing 4. Stator members 16 and 16' respectively preferably include annular support members 27 and 27' suitably bonded thereto and are held in place by means of springs 29 and 29' which in turn are respectively held in place by respective annular removable covers 28 and 28' which are respectively held in place by respective bolts (not referenced). At least one of stator members 16 and 16' are comprised of axially spaced-apart sections 34 and 34' hereinafter described more fully with respect to FIG. 2.

Rotors 18 and 18' are suitably electrically insulated from member 2 and secured for rotation in unison therewith. Balancing collars 20 and 20' are preferably respectively disposed about member 2 respectively outwardly from stator members 16 and 16' to provide balanced rotation of member 2. The outer periphery of sections 34 and 34' of at least one of stators 16 and 16' or a member secured thereto may be provided with gear teeth for causing rotation thereof relative to the other by engagement with teeth of a rotatable adjustment tool when screws 31 and 31' are loosened or by other suitable means such as hereinafter more fully described.

The combination of stator 16 and rotor 18 and of stator 16' and rotor 18' provides the respective magnetic field coupling circuits by which the respective excitation voltage or signal is able to be delivered to a wheatstone bridge mounted on member 2 and by which the output voltage or signal is able to be delivered therefrom for use in measuring stresses being imposed upon member 2. For illustrative purposes, stator 16 is the primary stator and rotor 18 is the secondary rotor providing the magnetic field coupling circuit by which the excitation voltage or signal is able to be delivered to leads 33 of wheatstone bridge 35 mounted on member 2 and rotor 18' is the primary rotor and stator 16' is the secondary stator providing a magnetic field coupling circuit by which the output voltage or signal is able to be delivered from leads 37 of bridge 35 mounted on member 2.

As previously described, at least one of the magnetic stator members 16 and 16' (in this case stator member 16) comprises a pair of magnetic stator sections 34 and 34' secured to housing 4 coaxially about rotary member 2. Stator sections 34 and 34' have a respective opening 21 therethrough that is larger in diameter than the outer diameter of rotary member 2 to enable member 2 to rotate therewithin without contacting sections 34 and 34'. Sections 34 and 34' are held in a bore (not referenced) in the right end of housing 4 as viewed in FIG. 1 by means of annular bracket 13. An annular support member 27 is preferably bonded to the outwardly facing surface of sections 34 and 34' as previously described and against which is urged annular spring 29 that is compressed by removable end cover 28 to hold sections 34 and 34' in a firm, stationary contacting relationship with housing 4.

Stator sections 34 and 34' are designed such that, when assembled in housing 4, a portion of one contacts a portion of the other to provide electrical contact therebetween. Preferably, the electrical contact is provided by axially extending annular extremities 36 of sections 34 and 36' of section 34' that are held in electrical contacting relationship with each other by means of springs 29 and cover plate 28 previously described.

An enlarged view of magnetic field coupling circuit 16 is shown in FIG. 2. In FIG. 2, annular axially spaced-apart magnetic stator sections 34 and 34' define an annular air gap 41 between axially facing surfaces 37 and 37' respectively of stator sections 34 and 34' which are respectively suitably secured to support members 27 and 27' which in turn are secured to housing 4 (not shown). Stator sections 34 and 34' and support member 27 and 27' have openings such as opening 21 therethrough large enough to enable member 2 to rotate relative thereto as well as to housing 4.

Stator sections 34 and 34' are made from a magnetic material as previously described and are in electrical contact with each other by means of respective contacting surfaces 36 and 36' of respective axial projections of each adjacent the radial extremity of stators 34 and 34' as shown in FIG. 2. Although stators 34 and 34' are preferably mirror images of each other, either one could be shaped as a flat disc if such were desired.

Rotor 18 is rotated within air gap 41 by member 2 and includes electrical windings 39 carried by rotor 18 at its radial extremity which, as previously described, are considered secondary rotor windings. Primary electrical stator windings 40 are disposed in air gap 41 as shown in FIG. 2. Stator windings 40 are connected to an electrical power source through electrical connection entrance 10 of housing 4 shown in FIG. 1. Rotor windings 39 are connected to leads 33 of wheatstone bridge 35 shown in FIG. 1. The combination of rotor 18, rotor windings 39, stator sections 34 and 34' and stator windings 40 provide one of the electromagnetic coupling circuits for rotary transducer 60. Electrification of stator windings 40 enable stator sections 34 and 34' to create an electromagnetic field in air gap 41 which induces an electric current in rotor windings 39 as rotor 18 rotates within the magnetic field.

At least one of stator sections 34 and 34' comprises a plurality of circumferentially spaced wedge shaped segments preferably having the configuration shown in FIGS. 3 and 4 whereby magnetic segment 50 has a wedge shaped body 46 having a "U" shaped opening 44 forming part of the air gap defined when two such segments are disposed opposite each other in axially spaced-apart stator sections. Body 43 of magnetic segment 50 has a projection 46 at its radial extremity that extends axially towards and is adapted to engage and provide electrical contact with an axial projection from an opposed magnetic segment as shown in FIG. 4. Segment 50 is adapted to be spaced circumferentially about rotary member 2 as previously described and has its minimum circumferential breadth "x" closest to member 2.

As shown in FIG. 4, segment 50 preferably has a lower section that tapers radially inwardly towards rotary member 2 but may have a generally rectilinear cross-sectional profile such as shown in dashed line by numeral 47.

The tapered cross-section provides the additional advantages of conserving the amount of magnetic material required for segment 50 as well as concentrating magnetic flux lines near the outer surface of rotary member 2 as is well known to those skilled in the art of magnetic stator design.

An embodiment of a stator section 70 is shown in FIG. 5 on which eight wedge shaped magnetic segments 50 are substantially uniformly spaced circumferentially about rotary member 2. In FIGS. 5 and 6 the viewer is looking axially towards the face of the stator sections such that in FIG. 5 projection 46 and air gap 44 are visible. In stator section 70, the respective adjacent facing edges 49 are in electrical contact with each other over their entire length.

In FIG. 6, stator section 80 has eight wedge shaped magnetic segments 52 having projecting portions 54 and an air gap 56 previously described. Segments 52 are substantially uniformly circumferentially spaced about rotary member 2 but have respective adjacent facing edges 58 and 62 that are tapered such that they contact each other for only a portion of their length providing an air gap 64 therebetween that communicates with air gap 56 between the stator sections.

In cases where both the stator sections have a plurality of circumferentially spaced wedge shaped magnetic segments whose opposed facing, edges do not contact each other over their entire length, rotation of one stator section relative the other will alter the air gap configuration and thereby alter the reluctance and provide control over the magnetic field coupling circuit.

The stator segments may be made and secured to their respective support members in any suitable manner. The support member itself may be made from a magnetic material which operates to hold the segments in their respective circumferential positions while they are secured to the support member by potting or other suitable means.

What is claimed is:

1. An improved magnetic field coupling circuit between relatively fixed and rotary members, said fixed member comprising a pair of adjacently positioned magnetic stator sections secured in coaxial relation to the rotary member and having an electrical contact relationship therebetween and having a portion of respective facing surfaces thereof spaced axially apart from each other to provide an annular air gap therebetween disposed coaxially about the rotary member in which electrical stator windings are disposed that upon electrification by an electrical power source provide an electromagnetic field having a reluctance characteristic thereof, and a rotor member secured to the rotary member and operative to rotate in unison therewith, said rotor member carrying electrical rotor windings that are rotated thereby within the air gap electromagnetic field to provide the electromagnetic coupling circuit between the stator and rotor windings, wherein the improvement is characterized by at least one of said stator sections comprising a plurality of wedge shaped segments spaced circumferentially about the rotary member having their respective narrowest circumferential breadth located closest the rotary member and having at least a portion of respective adjacent facing edges thereof providing electrical contact therebetween.

2. The coupling circuit of claim 1 wherein the electrical contact relationship between the stator sections is provided by at least one of said sections having a portion adjacent the radial extremity thereof that extends axially towards and engages the other stator section to provide the electrical contact therebetween.

3. The coupling circuit of claim 1 wherein both of the stator sections comprise a plurality of wedge shaped segments respectively spaced circumferentially about the rotary member having at least a portion of adjacent facing edges thereof providing electrical contact therebetween.

4. The coupling circuit of claim 3 wherein only a portion of the adjacent facing edges of the respective stator section segments provide electrical contact therebetween and at least one of the stator sections is rotatable relative the other such that relative rotation therebetween is operative to alter the air gap configuration and thereby alter the reluctance of the magnetic field to provide control of the magnetic coupling circuit.

5. An improved rotary transducer of the type comprising a housing, a rotary member rotatably mounted on the housing and having a sensing section adapted to enhance sensing of stresses imposed upon the rotary member, at least one sensor member mounted on the sensing section and operative to provide an electrical signal indicative of stresses imposed upon the rotary member, at least one magnetic stator member comprising a pair of adjacently positioned magnetic stator sections secured in coaxial relation to the rotary member and having an electrical contact relationship therebetween and having a portion of respective facing surfaces thereof spaced axially apart from each other to provide an annular air gap therebetween disposed coaxially about the rotary member in which electrical stator windings are disposed that upon electrification by an electrical power source provide an electromagnetic field having a reluctance characteristic thereof, and at least one rotor member secured to the rotary member and operative to rotate in unison therewith, said rotor member carrying electrical rotor windings that are rotated thereby within the air gap electromagnetic field to provide the electromagnetic coupling circuit operative to transfer the sensor member signal between the stator and rotor windings, wherein the improvement is characterized by at least one of said stator sections comprising a plurality of wedge shaped segments spaced circumferentially about the rotary member having their respective narrowest circumferential breadth located closest the rotary member and having at least a portion of respective adjacent facing edges thereof providing electrical contact therebetween.

6. The rotary transducer of claim 5 wherein the electrical contact relationship between the stator sections is provided by at least one of said stator sections having a portion adjacent the radial extremity thereof that extends axially towards and engages the other stator section to provide the electrical contact therebetween.

7. The rotary transducer of claim 5 wherein both of the stator sections comprise a plurality of wedge shaped segments respectively spaced circumferentially about the rotary member having at least a portion of adjacent facing edges thereof providing electrical contact therebetween.

8. The rotary transducer of claim 7 wherein only a portion of the adjacent facing edges of the respective stator section segments provide electrical contact therebetween and at least one of the stator sections is rotatable relative the other such that relative rotation therebetween is operative to alter the air gap configuration and thereby alter the reluctance of the magnetic field to provide control of the magnetic coupling circuit.

* * * * *